Oct. 14, 1941.  H. STEEN ET AL  2,258,912
STAMP DISPENSING MACHINE
Filed May 23, 1939  7 Sheets-Sheet 1

FIG. 1

INVENTORS
HERBERT STEEN
GEORGE R. SUTHERLAND
By Paul, Paul Moore [illegible]
ATTORNEYS Oct. 14, 1941.  H. STEEN ET AL  2,258,912
STAMP DISPENSING MACHINE
Filed May 23, 1939   7 Sheets-Sheet 2

INVENTORS
HERBERT STEEN
GEORGE R. SUTHERLAND
ATTORNEYS

Oct. 14, 1941.   H. STEEN ET AL   2,258,912
STAMP DISPENSING MACHINE
Filed May 23, 1939   7 Sheets-Sheet 3

INVENTORS
HERBERT STEEN
GEORGE R. SUTHERLAND
ATTORNEYS

Oct. 14, 1941.  H. STEEN ET AL  2,258,912
STAMP DISPENSING MACHINE
Filed May 23, 1939  7 Sheets-Sheet 4

INVENTORS
HERBERT STEEN
GEORGE R. SUTHERLAND
ATTORNEYS

Oct. 14, 1941.     H. STEEN ET AL     2,258,912
STAMP DISPENSING MACHINE
Filed May 23, 1939     7 Sheets-Sheet 5

INVENTORS
HERBERT STEEN
GEORGE R. SUTHERLAND
ATTORNEYS

Oct. 14, 1941.  H. STEEN ET AL  2,258,912
STAMP DISPENSING MACHINE
Filed May 23, 1939  7 Sheets-Sheet 6

INVENTORS
HERBERT STEEN
GEORGE R. SUTHERLAND
By Paul, Paul & Moore
ATTORNEYS Oct. 14, 1941.   H. STEEN ET AL   2,258,912
STAMP DISPENSING MACHINE
Filed May 23, 1939   7 Sheets-Sheet 7

INVENTORS
HERBERT STEEN
GEORGE R. SUTHERLAND
By Paul, Paul Moore Gierz
ATTORNEYS Patented Oct. 14, 1941

2,258,912

UNITED STATES PATENT OFFICE 2,258,912

STAMP DISPENSING MACHINE

Herbert Steen and George R. Sutherland, Chicago, Ill.

Application May 23, 1939, Serial No. 275,238

15 Claims. (Cl. 164—42)

This invention relates to new and useful improvements in dispensing machines, and more particularly to a machine for dispensing variable quantities of postage stamps of different denominations.

An object of the present invention is to provide a machine for quickly and accurately dispensing postage stamps, which is simple and positive in operation, and whereby the present method of manually handling the stamps by the vendor, each time a sale is made, is eliminated.

It is now quite common for drug stores, cigar stores, hotels, and other places of business, to sell postage stamps, as an accommodation to their customers and the trade. Because there is no profit gained by the sale of stamps by such places, they usually carry only a limited stock of stamps of the more popular denominations. The stamps are usually furnished to the above sellers in sheet form. These stamp sheets are kept in a suitable drawer or box, and must be manually handled by a clerk or attendant, each time a stamp sale is made, as the clerk must manually tear the required number of stamps from a sheet, and hand them to the purchaser. This method of vending stamps is slow and unsanitary, and errors are very likely to occur. In places such as above enumerated, it is also more or less common that several individuals have access to the stamp drawer or box, which increases the possibility of errors, and if an individual is inclined to be dishonest, the proprietor may suffer financial loss.

It is therefore highly desirable that means be provided whereby the objectionable features now prevalent in the usual sale of postage stamps, may be entirely eliminated, and whereby variable quantities of stamps of different denominations may be quickly and conveniently dispensed in a sanitary manner, and an accurate record made of each sales transaction.

It is therefore an object of the present invention to provide a simple and inexpensive machine for dispensing stamps of different denominations, which is small and compact in size, whereby it may be conveniently placed on a counter or desk at a location convenient to both the purchaser and the attendant. The machine has mechanisms for selectively dispensing variable quantities of stamps of different denominations by the manipulation of a single control member.

By the employment of the novel machine, herein disclosed, drug stores, hotels, railway stations, and various other places where stamps are usually sold, as an accommodation to customers and the public, stamp sales may be conveniently and expeditiously transacted with greater accuracy, regardless of the quantity and variety of stamps requested by the purchaser. The machine also readily lends itself for use in postoffices and other places where a great many stamp sales may be transacted each day. The machine provides the utmost in sanitation, in that the stamps sold at each transaction are not manually handled by the clerk or attendant, but are delivered directly to the purchaser by the machine.

A further object is to provide a machine of the character described comprising in combination, a stamp dispensing mechanism, a stamp accounting mechanism, and a cash receiving drawer in which the cash received from each sale may be deposited, and whereby at the close of each day's business, the money contained in the cash drawer may be checked against the number of stamps sold during the day. By thus keeping an accurate record of the quantity of stamps sold each day, losses to the proprietor may be prevented, in that the person in charge of the stamp dispensing machine may be required to account for all stamps issued to him, either in stamps or cash, at the close of each day's business.

A further object is to provide a dispensing machine comprising a stamp dispensing unit, a cash receiving drawer, and a control member adapted to be actuated by the clerk or operator of the machine, and a single locking means being provided for locking the entire machine against operation, whereby it cannot be operated by an unauthorized person.

Other objects of the invention reside in the novel construction of the stamp feeding mechanism, including the stamp guide which has a portion partially encircling the feed roll, and is movably mounted with respect to the feed roll to facilitate threading the stamp strip around the feed roll, in the operation of loading the machine; in the means provided for holding the stamp strip in engagement with the pins on the feed roll, to facilitate tearing the ejected stamps from the strip; in the means provided for automatically interrupting operation of any one of the dispensing units, when all of the stamps therein have been exhausted; in the means provided for intermittently operating the feed roll and whereby the feed roll cannot overrun; in the provision of a cash receiving drawer having a suitable locking member adapted to be operated by a single key member, to lock the drawer in closed position, means being associated with said key member adapted to open the supply circuit to the power devices of the various dispensing units, each time the locking member is in drawer-locking position, thereby rendering the entire machine inoperative, when the cash drawer is locked; in the novel construction and arrangement of the casing for enclosing the operating mechanism of the machine; and, in the simple and inexpensive construction of the entire apparatus.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 11 is a detail sectional view showing the means for moving the feed roll locking lever out of engagement with the feed roll;

Figure 12 is a view showing the means for locking the feed roll to prevent a purchaser from receiving more stamps than he is entitled to;

General

The novel stamp dispensing machine herein disclosed is adapted primarily for dispensing varying quantities of stamps of different denominations, and it is provided with means for keeping an accurate record of the number of stamps sold of each denomination. The operation of the machine is not dependent upon the insertion of a coin into the machine, but by the manipulation of a control member, adapted to be actuated by an attendant, although it is to be understood that the stamp dispensing units may readily be embodied in a coin-actuated machine, if so desired. The machine may also be used for dispensing other articles, such as theatre tickets, by slightly altering certain of the parts thereof to adapt it for handling such articles. The dispensing machine, as herein shown, comprises two stamp dispensing mechanisms or units, whereby stamps of two different denominations may be dispensed. These units are generally designated by the letters A and B, and are alike in construction, whereby they may be interchanged or other similar units substituted therefor, if desired. Any number of dispensing units may be employed, depending upon the number of stamps of different denominations it is desired to dispense, the casing, of course, being designed to accommodate the number of dispensing units contained in the machine.

Dispensing units

Figure 5:
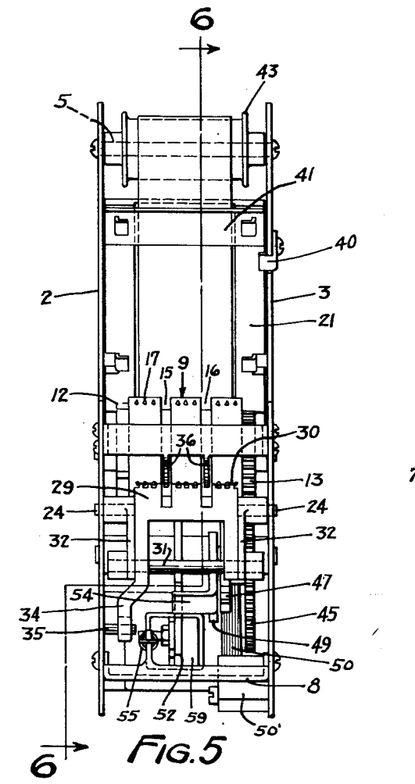
Figure 5 is a front view of one of the dispensing units, removed from the casing.
Figure 6:
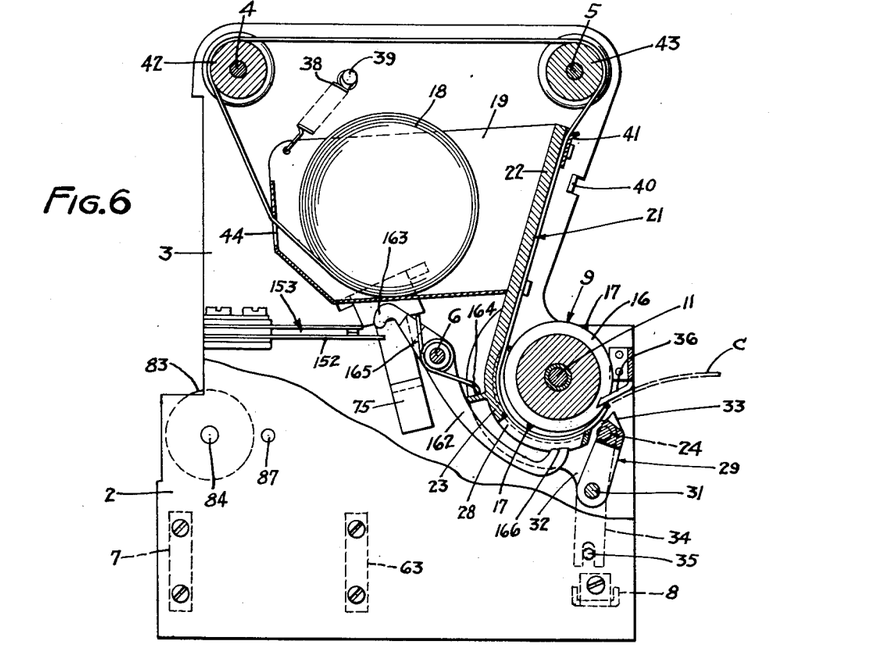
Figure 6 is a side view of Figure 5, partially in section, and showing the stamp guide positioned to permit the stamp strip to be threaded through the machine, some of the parts being omitted.
Figure 7:
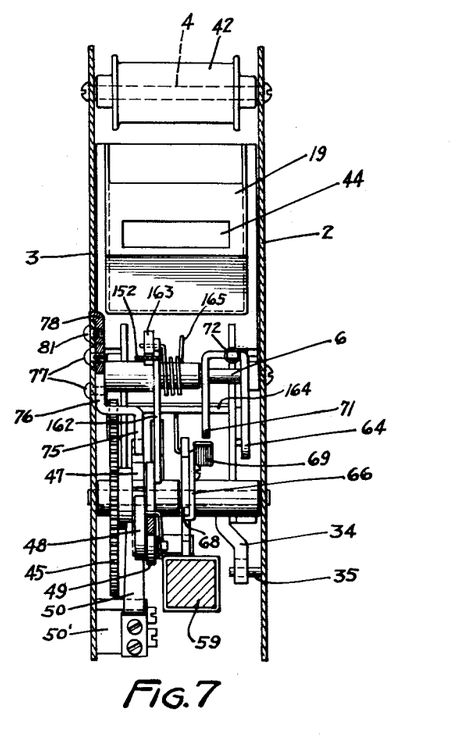
Figure 7 is a vertical sectional view substantially on the line 7—7 of Figure 1, taken through one of the dispensing units only.

The dispensing units being alike in construction, but one will be described in detail. As shown in Figures 5, 6, and 7, each dispensing unit comprises side plates 2 and 3 secured together by a plurality of cross shafts or rods 4, 5 and 6, and cross bars 7 and 8, whereby the plates 2 and 3 are supported in fixed spaced relation.

Figure 9:
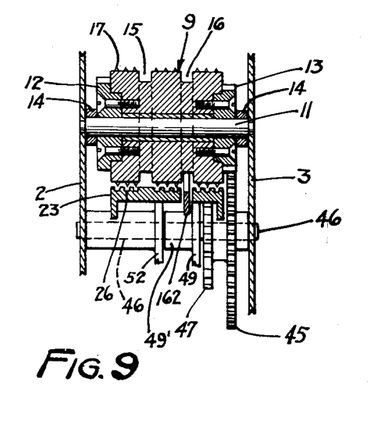
Figure 9 is a detail sectional view on the line 9—9 of Figure 8, showing the drive for the feed roll.

A stamp feed roll, generally indicated by the numeral 9 is mounted on a shaft 11 having its ends suitably supported in the side plates 2 and 3. A suitable ratchet 12 is secured to one end of the feed roll 9, as shown in Figure 9, and a pinion 13 is provided at the opposite end of the feed roll. Suitable spacing collars 14 are shown interposed between the ratchet 12 and pinion 13 and their respective side plates 2 and 3, thereby to retain the feed roll in position upon the shaft 11.

The feed roll, as best shown in Figure 9, is shown provided with two circumferential grooves 15 and 16, which divide the periphery of the feed roll into three sections. Axially disposed rows of teeth 17 are provided in the periphery of the feed roll adapted to be received in the usual perforations provided between the stamps in the stamp strip.

The rows of teeth 17 are uniformly spaced around the circumference of the feed roll, and the spacing between rows substantially corresponds to the spacing between the rows of perforations in the stamp strip, whereby the rows of pins of the feed roll will engage each row of perforations in the stamp strip. In the structure, as here shown, the diameter of the feed roll is such as to accommodate four rows of teeth 17, and at least two rows of teeth are always engaged with perforations in the stamp strip, as clearly illustrated in Figures 1, 6 and 8.

Stamp guide

Figure 1:
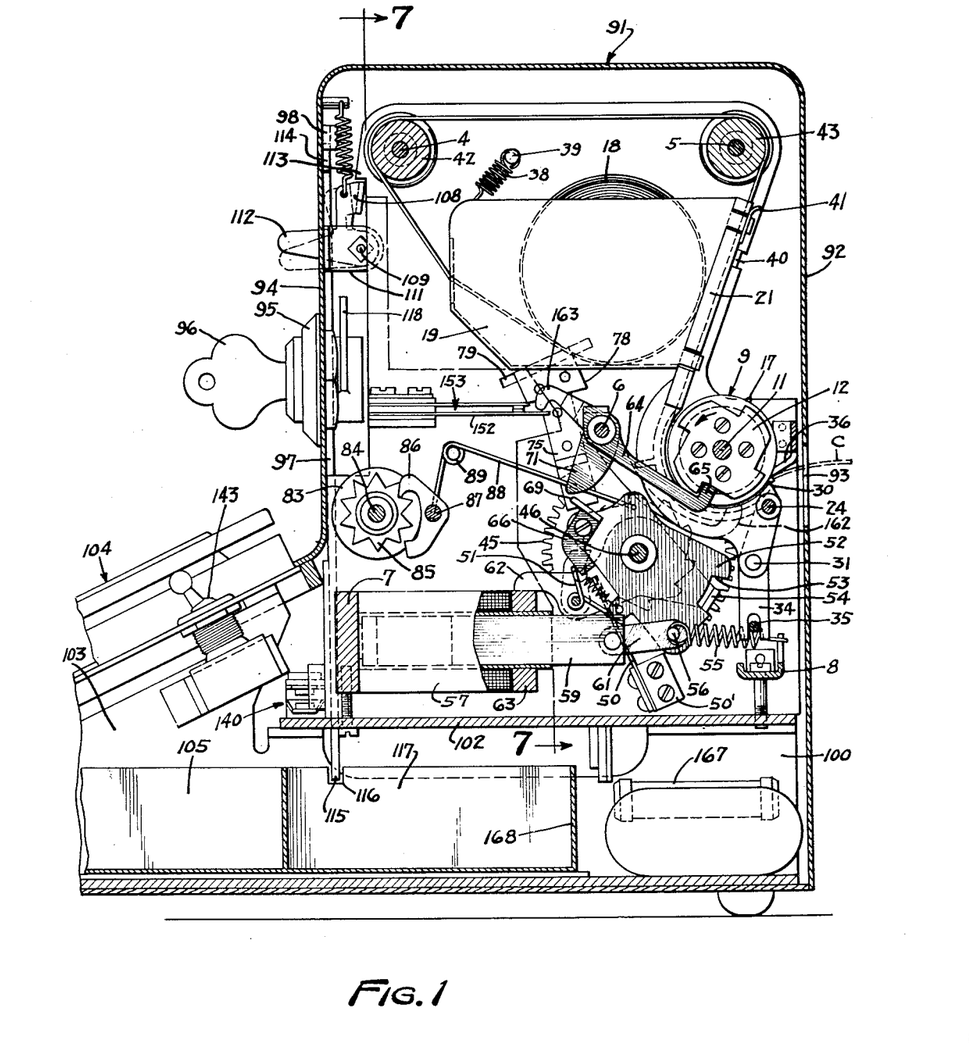
Figure 1 is a vertical sectional view showing the operating mechanism of the machine, and the locking bar in locking position.
Figure 8:
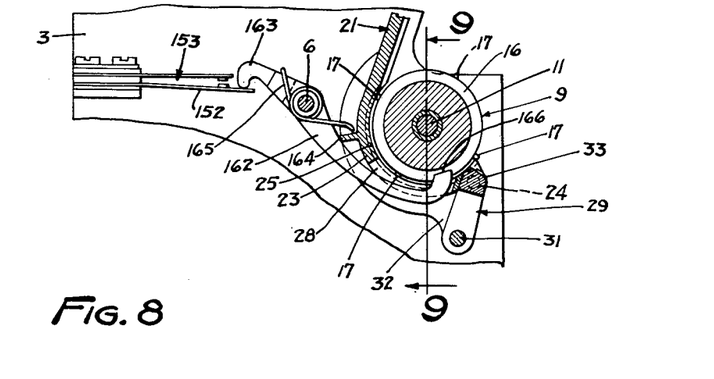
Figure 8 is a fragmentary view showing the stamp guide in operative position with respect to the feed roll.

An important feature of the machine resides in the novel means provided to facilitate threading the stamp strip around the feed roll, when loading the machine. As best shown in Figure 6, the supply of stamps is in the form of a roll 18 adapted to be supported in a holder or hopper 19. To facilitate manufacture, the hopper 19 is here shown supported upon a stamp guide, generally designated by the numeral 21, and having an upright portion 22 to which the hopper 19 is suitably secured. The lower portion 23 of the stamp guide 21 partially encircles the feed roll 9, and is pivotally supported at 24 upon the side plates 2 and 3. In Figure 8, the stamp guide is shown in its normal operative position with respect to the feed roll 9. When thus positioned, the gap provided between the periphery of the feed roll and the concave surface 25 of the lower portion 23 of the stamp guide, is slightly more than the thickness of the stamp strip. This permits the stamps, in strip form, to be readily fed between the periphery of the feed roll and the stamp guide, by the teeth 17 of the feed roll engaging the perforations in the stamp strip. By reference to Figure 9, it will be noted that the concave surface 25 of the stamp guide is circumferentially grooved, as shown at 26, to receive the projecting terminals of the teeth 17 of the feed roll. The length of the teeth 17 is such that they pass through the perforations in the stamp strip and into the grooves 26 a sufficient distance to positively prevent the teeth from becoming disengaged from said perforations, when the stamp guide is in its normal operative position, as shown in Figures 1 and 8. The lower portion 23 of the stamp guide is shown provided with an elongated opening 28, the purpose of which will subsequently be described.

Figure 2:
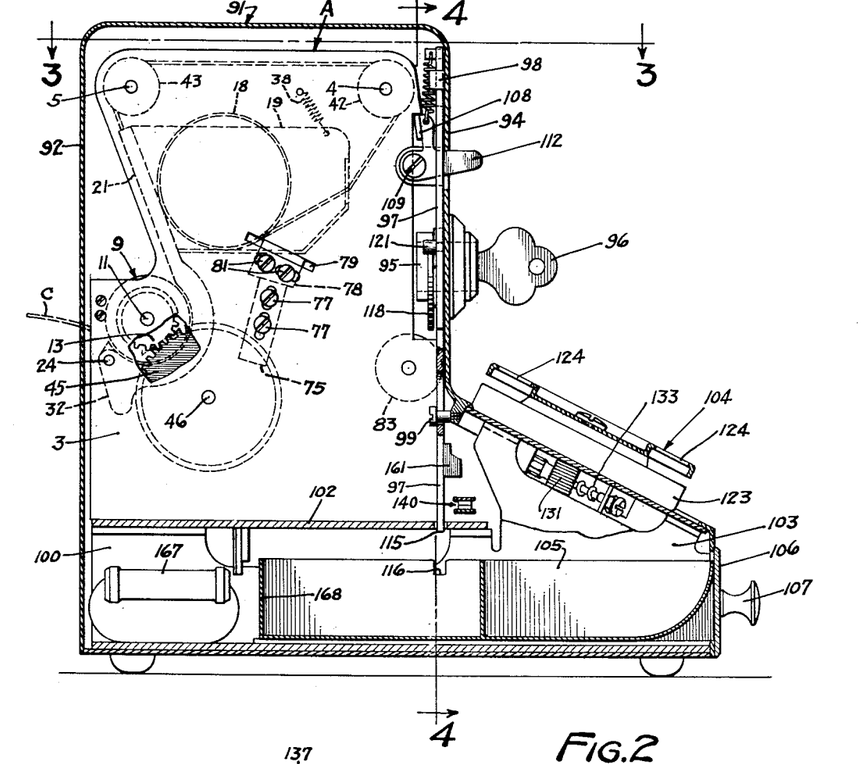
Figure 2 is a vertical sectional view on the line 2—2 of Figure 3, showing the locking bar positioned to render the machine operative.
Figure 16:
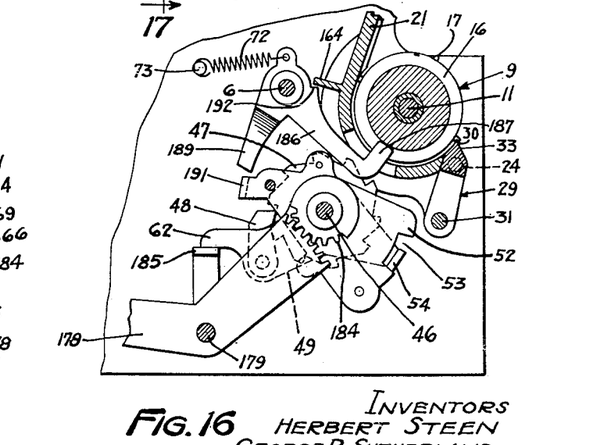
Figure 16 is a detail sectional view of the structure illustrated in Figure 15, showing the means for locking the mechanism against operation, when the machine has been emptied of stamps.

Another important feature of the invention resides in the provision of means for holding the stamp strip in close contact with the periphery of the feed roll, at the point where the ejected stamps are severed or torn from the stamp strip by the purchaser, and whereby the purchaser cannot receive more stamps than he is entitled to. The means provided for thus holding the stamp strip in close contact with the periphery of the feed roll, at the point where the stamps are ejected or diverted from the feed roll, as shown by the dotted lines C in Figures 1, 2 and 6, is best shown in Figures 6, 8 and 16, and comprises a spring-actuated member 29 pivotally supported upon a shaft 31 carried by depending arms or lugs 32 which, for convenience, may be integrally formed with the stamp guide 21, as best shown in Figures 6 and 8. The member 29 has a transverse portion 33 normally positioned in close proximity to the periphery of the feed roll 9, as best shown in Figure 8, when the stamp guide 21 is in its normal position. The transverse portion 33 of the member 29 has a relatively sharp edge 30, which serves as a knife or straight edge adapted to cooperate with a row of pins of the feed roll to facilitate severing or tearing the ejected or dispensed end of the stamp strip from the strip, as will readily be understood by reference to Figure 1. To simplify the description of the apparatus, the member 29, including the transverse portion 33, will hereinafter be referred to as the stamp severing member 33.

Means is provided for moving the knife edge 30 of the stamp severing member 33 outwardly away from the periphery of the feed roll 9, as shown in Figure 6, to facilitate threading the stamp strip around the feed roll. The means provided for thus moving the member 33 away from the feed roll is shown comprising a depending forked arm 34, provided in the member 33, and which has its lower end engaged with a pin 35, which may be secured in the side plate 2 of the unit. The pin 35 prevents the lower forked end of the arm 34 from relatively swinging with respect to the pin, when the stamp guide 21 is pressed backwardly, as shown in Figure 6, whereby the portion 33 of the member 29 will swing outwardly because of the shaft 31 upon which it is mounted, being moved in a direction towards the right, when viewed as shown in Figures 6 and 8. Because of the shaft 31 being carried by the lower portion of the stamp guide 21, the member 33 is automatically moved outwardly away from the periphery of the feed roll, simultaneously as the concave surface 25 of the stamp guide is moved away from the feed roll, when the upper portion of the stamp guide is pressed inwardly or in a direction towards the hopper 19.

A suitable stripper 36 is fixedly mounted over the member 33 and has a pair of fingers projecting into the grooves 15 and 16 of the feed roll, whereby the leading stamp in the stamp strip will engage said stripper fingers and move outwardly in the direction indicated by the dotted lines C in Figures 1, 2 and 6. The stamp guide is normally retained in the position shown in Figure 8, by a suitable spring 38, one end of which may be secured to the hopper and its opposite end to a suitable pin 39 secured to one of the side plates of the dispensing unit. The upper end of the stamp guide is shown having a metallic strap 41 secured thereto and spaced from the adjacent surface of the upper portion 22 of the stamp guide, thereby to retain the stamp strip in position with respect to the stamp guide 21. Suitable rollers 42 and 43 are preferably provided on the cross shafts or rods 4 and 5, for guiding the stamp strip from the hopper 19 to the stamp guide 21. The stamp strip passes through a suitable opening 44 provided in the rear wall of the hopper. A suitable stop 40 is provided for limiting outward movement of the stamp guide 21, and to assure accurate spacing between the concave surface 25 of the lower portion of the stamp guide and the periphery of the feed roll 9.

*Feed roll drive*

Figures 11, 12:
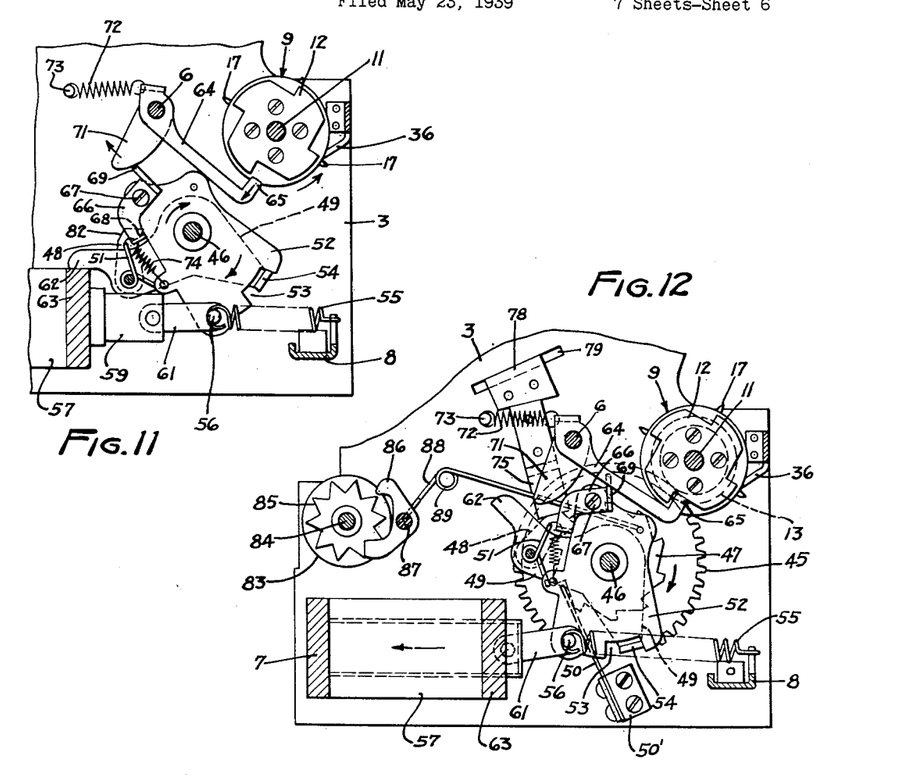

The means for driving the feed roll 9 is best shown in Figures 1, 9 and 12, and comprises a gear wheel 45 shown mounted on a shaft 46 having its terminals supported in the side plates 2 and 3 of the dispensing unit. The gear wheel 45 is shown provided with a hub to which a suitable ratchet 47 is secured. The gear 45 is adapted to be intermittently operated by a pawl 48 engaging the ratchet 47. The pawl is carried by a plate 49 having a hub 49' rotatably mounted on the shaft 46 adjacent to the ratchet 47. A suitable spring 51 is shown supported on the pivot of the pawl 48, and has one end engaged with the pawl and its opposite end with the plate 49, whereby the spring 51 constantly urges the pawl into engagement with the teeth of the ratchet 47.

The means provided for operating the plate 49 to drive the ratchet 47 is shown comprising a member 52 having a hub 52' rotatably supported on the shaft 46. A notch 53 is provided in the edge of the member 52 adapted to receive an off-set lug 54 provided on the plate 49. The lug 54 is relatively shorter than the length of the notch 53 to provide a certain amount of play between the member 52 and plate 49. It is to be understood that the plate 49 is driven by oscillatory movement of the member 52. The member 52 is normally retained in the position shown in Figure 1 by a suitable spring 55, having one end attached to a pin 56 secured to the member 52, and its opposite end to a lug provided on the cross member 8 of the frame of the dispensing unit.

In the structure as herein disclosed, the member 52 is operated by a suitable solenoid, generally indicated by the numeral 57. This solenoid has one end secured to the cross bar 7 of the frame of the unit, and has an armature 59 projecting from one end thereof. A link 61 operatively connects the armature 59 to the pin 56 of the member 52, whereby each time the solenoid is energized, and the armature 59 is drawn into the windings of the solenoid, the member 52 is operated to, in turn, actuate the ratchet 47 through the pawl 48. The plate 49 has an extension 62 adapted to engage a cross member 63 of the solenoid, when the armature 59 is projected or withdrawn from the solenoid by the action of the spring 55. The extension 62 thus limits rotary movement of the plate 49 and member 52 in one direction. A flexible element 50 has one end engaging the face of the ratchet 47 to limit rotation thereof in one direction. The element 50 is shown supported by a bracket 50' which may be secured to one of the frame side plates of the unit.

Feed roll locking means

Means is provided for locking the feed roll against further rotation, at the end of each cycle of operation, whereby a purchaser cannot receive more stamps than he is entitled to. The means provided for thus limiting rotation of the feed roll, is shown comprising an arm 64 shown pivotally supported on the cross shaft or rod 6, and having an offset end portion 65 adapted to engage the teeth of the feed roll ratchet 12. In Figure 1, the arm 64 is shown in its normal position in engagement with the teeth of the ratchet 12, or the position assumed at the end of each cycle of operation. When the arm is thus engaged with the ratchet 12, the feed roll is positively locked against rotation, in the direction indicated by the arrow in Figure 1.

Means is provided for moving the arm 64 out of engagement with the ratchet 12, when the solenoid 57 is energized to drive the feed roll, and is shown comprising an element 66 mounted for pivotal movement on a suitable pivot 67 secured to the member 52, as best shown in Figures 1, 11, and 12. The lower end portion 68 of the element 66 is offset and adapted to engage the edge of the member 52 (see Figure 7) to limit rotary movement of the element in a counter-clockwise direction, when viewed as shown in Figure 1. The opposite end 69 of the element 66 is offset in the opposite direction and adapted to engage a depending portion 71 of the arm 64, when the element 66 and arm 64 are in their normal positions, as shown in Figure 1.

A suitable spring 72 has one end connected to the arm 64 and its opposite end to a fixed portion 73 of the frame of the unit, whereby the spring 72 constantly acts to urge the arm 64 into engagement with the ratchet 12. The element 66 is retained in its normal position, shown in Figures 1 and 12, by a relatively light spring 74, one end of which is attached to the element 66 and its opposite end to the member 52.

The purpose of the element 66 and depending portion 71 of the arm 64 is to move the offset end portion 65 of the arm out of engagement with the ratchet 12, when the solenoid is initially energized to actuate the feed roll.

This is accomplished by the play allowed between the lug 54 of the plate 47 and the ends of the notch 53 in the member 52, whereby the initial movement of the member 52 will cause the offset end portion 69 of the element 66 to engage the depending portion 71 of the arm 64 and move it upwardly. When the portion 71 of the arm 64 is thus swung upwardly to the position shown in Figure 11, the end portion 65 of the arm 64 is moved out of engagement with the ratchet 12, before any movement is imparted to the plate 49. In other words, when the parts are in their normal positions, as shown in Figure 1, it will be noted that the lug 54 of the plate 49 will be engaged with the lower wall of the notch 53, thereby allowing the member 52 to rotate a portion of its stroke without imparting any movement to the plate 49. Such initial movement of the member 52 will cause the offset end portion 69 of the element 66 to engage the portion 71 of the arm 64, as hereinbefore stated, and move the offset end portion 65 of the arm out of engagement with the ratchet 12 before the lug 54 engages the opposite end wall of the notch 53, after which the plate 49 and member 52 rotate as a unit.

When the member 52 and plate 49 return to their normal positions, shown in Figure 1, the offset end portion 69 of the element 66 will engage the depending portion 71 of the arm 64 without imparting any movement to the arm, because of the spring 74 of the element being relatively lighter than the spring 72 of the arm 64. It will thus be seen that each time the solenoid is energized, the feed roll 9 is released from the arm 64 by the initial movement of the member 52, whereby the feed roll is rotated to eject a stamp, when the member 52 engages the lug 54 and rotates the plate 47 in the direction indicated by the arrow in Figure 11, because of the feed roll being connected to the plate 47 through the gears 45 and 13.

Feed roll alining means

Means is provided for causing each row of pins 17 of the feed roll to come to rest adjacent the stripper fingers 36 and stamp severing member 33, at the completion of each cycle of operation. The means provided for thus causing the feed roll to come to rest with a row of its pins 17 located adjacent to the stripper fingers 36, is shown comprising a suitable stop 75 positioned in the plane of the drive pawl 48, whereby the upper end or face 82 of the pawl will engage said stop to limit the forward movement of the pawl, each time it is actuated by energization of the solenoid. The stop 75 is shown having an offset end portion 76 fitted against the side plate 3 and secured thereto by a pair of small screws 77 received in slots provided in the plate 3, as clearly illustrated in Figures 2 and 7. The upper end of the portion 76 of the stop 75 is shown engaged with the lower cam shaped end of an adjusting plate 78, having its upper end offset and slidably received in a guide slot 79, provided in the side plate 3. Screws 81 are received in threaded engagement with the adjusting plate 78, and are received in slots provided in the side plate 3, whereby the adjusting plate may be moved in a direction lengthwise of the slot 79, thereby to facilitate vertically adjusting the stop 75, as will readily be understood by reference to Figures 2 and 7.

The lower edge of the stop 75 is adapted to be engaged by the face 82 of the drive pawl 48, when the latter reaches a predetermined position in its forward movement, whereby the swinging end of the drive pawl is wedged between the bottom of the ratchet tooth with which it is engaged, and the lower edge of the stop 75, thereby preventing further forward movement of the pawl 48, and therefore the ratchet 47. The stroke of the solenoid 57 is such that the engagement of the pawl 48 with the stop 75 limits the movement of the armature 59 of the solenoid in the direction indicated by the arrow in Figure 12.

The above described mechanism provides means whereby the feed roll may be conveniently adjusted so that a row of its pins will be properly positioned with respect to the stripper fingers 36 and member 33 each time the mechanism comes to rest.

Stamp counter

Figure 10:
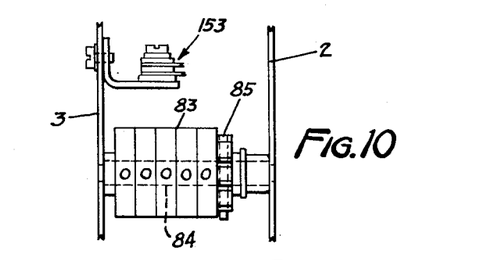
Figure 10 is a fragmentary view showing the counter.

Each dispensing unit comprises an independent stamp counter, generally indicated by the numeral 83 in Figures 10 and 12. This counter may be of conventional construction, and is supported on a fixed shaft or rod 84 supported in the side plates 2 and 3 of the unit. One end of the counter is provided with the usual star wheel 85 engaged by a drive dog 86, shown secured to a rock shaft 87 which may be operated by a suitable connection 88 having one end secured to the shaft 87 and its opposite end attached to the member 52, as clearly illustrated in Figure 12. To simplify construction, the connection 88 is preferably made of spring wire, and is provided with a suitable coil 89, to allow for variations in the relative movements between the dog 86 and the member 52. The counter is actuated at each impulse or cycle of the machine so that the total number of stamps sold or dispensed by the unit is indicated on the counter, as will be readily understood.

Enclosing casing

The dispensing mechanisms or units are shown enclosed within a suitable casing, generally designated by the numeral 91. This casing is provided with a front wall 92 having a plurality of suitable openings 93 therein, one for each stamp unit. Through these openings, the stamps are ejected, as indicated at C in Figures 1, 2 and 6. The rear wall 94 of the casing is provided with a suitable lock 95 operable by a key member 96. A locking bar 97 is mounted on the inside of the rear casing wall 94, in suitable guides 98 and 99, the latter being in the form of a screw, as best shown in Figures 2 and 4. In the structure, as shown in Figures 1, 2, 3, and 4, the dispensing units A and B are supported upon a suitable base 101, including a top plate 102, to which the dispensing units are detachably secured. The base 101 is preferably box-shaped and comprises side walls 100 having rearwardly projecting portions 103, the upper edges of which are inclined, as shown to provide a convenient support for a control member 104, subsequently to be described.

A coin-receiving tray or drawer 105 is slidably received in the base 101, and has a front panel or plate 106 which provides a closure for the open rear end of the base, when the drawer or tray 105 is in closed position, as shown in Figure 2. The drawer has a suitable finger grip 107, whereby it may be conveniently withdrawn from the base. The drawer 105 may also be provided with suitable partitions, whereby coins of different denominations may be separated from one another therein.

Means for locking machine

Means is provided for locking the casing to the control unit so that it cannot be removed from the apparatus by an unauthorized person. The means provided for thus locking the casing in position, is shown comprising a spring-actuated latch 108 which is pivotally supported on a pivot 109 mounted in a bracket 111 secured to the rear wall 94 of the casing, as shown in Figures 1 and 4. The latch 108 has a portion 112 projecting through a small slot in the rear wall of the casing and providing a finger grip whereby the latch 108 may be moved out of locking engagement with a shoulder 113 provided in a side plate of one of the dispensing units, as clearly illustrated in Figures 1 and 2. A spring 100 constantly tends to urge the latch 108 into locking engagement with the shoulder 113 of the unit side plate.

The locking bar 97 has a lateral extension 114 adapted to be moved to a position between the upper end of the latch 108 and the rear wall 94 of the casing, whereby the latch cannot be swung out of engagement with the shoulder 113. The lower end 115 of the locking bar is adapted to be received in a notch 116 provided in the longitudinally extending partition 117 of the drawer, when the locking bar is in its lowered position, shown in full lines in Figure 1. When thus positioned, the drawer cannot be opened.

From the foregoing, it will be seen that the locking bar thus serves to lock the casing in position on the apparatus, and also to lock the drawer in closed position, when the machine is not in use. The locking bar is actuated by a semi-circular disk 118 forming a part of the lock 95, and having oppositely disposed edges 119 adapted to engage a pin 121 secured to the locking bar.

Control means

In the apparatus as herein disclosed, the solenoids 57 provide the power means for actuating the dispensing mechanisms or units. One such solenoid is provided for each unit, whereby the units are adapted for independent operation. The flow of current to the solenoids is controlled by a suitable control unit, generally designated by the numeral 120, and shown in Figure 13. The control unit functions as a circuit closer or impulse device, and is adapted to successively close the circuit to a selected solenoid, whereby the latter is actuated to eject one or more stamps from the machine.

Figure 13:
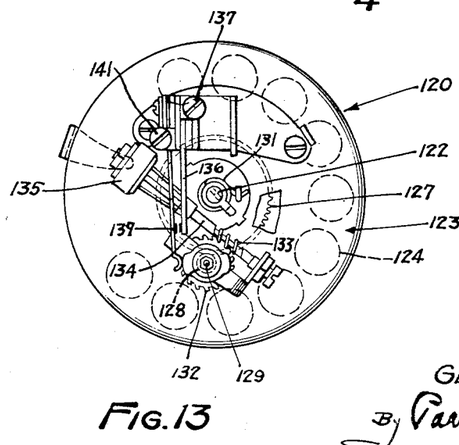
Figure 13 is a view showing an impulse device adapted to be set into operation by manipulation of the control member, to cause actuation of the power device of a selected dispensing unit.

The circuit closer or impulse device 120 is best shown in Figure 13, and comprises a shaft 122 rotatably mounted in a suitable support 123 and having the dial 104 secured to one end thereof. The dial 104 is provided with suitable finger receiving openings 124, superimposing a series of numerals, generally indicated by the numeral 125, and which numerals are provided on a disk 126 secured to the support 123. In the machine herein disclosed, the numerals 125 represent the number of stamps to be dispensed each time the machine is operated.

A gear 127 is mounted on the shaft 122 within the support 123 and meshes with a pinion 128 secured to a shaft 129. The gear 127 is driven in one direction, by a suitable ratchet device, not shown, when the dial 104 is rotated by the operator. The shaft 122 projects through the bottom wall of the support 123 and has a suitable spring 131 coiled thereabout and arranged to return the gear 127 to its normal position against a suitable stop, not shown.

A small worm gear 132 is shown secured to the shaft 129 and meshes with a worm 133 fixed on the shaft 134. The shaft 134 is shown mounted in suitable bearings provided on the support 123. A suitable governor, generally indicated by the numeral 135, is provided at one end of the shaft 134 and acts to control the rotation thereof. A fixed contact 136 is mounted on the support 123 in insulated relation thereto and has a suitable terminal screw 137 to which one end of a wire 138 is secured. The fixed contact 136 is adapted to be engaged by a movable contact 139, insulated from the fixed contact 136 and the support 123. The contact 139 has a terminal screw 141 which is shown connected by a wire 42 to a selector switch 143 having a movable contact arm 144 adapted to be selectively moved into engagement with a pair of fixed contacts 145 and 146, as shown in the wiring diagram, Figure 14.

Figure 14:
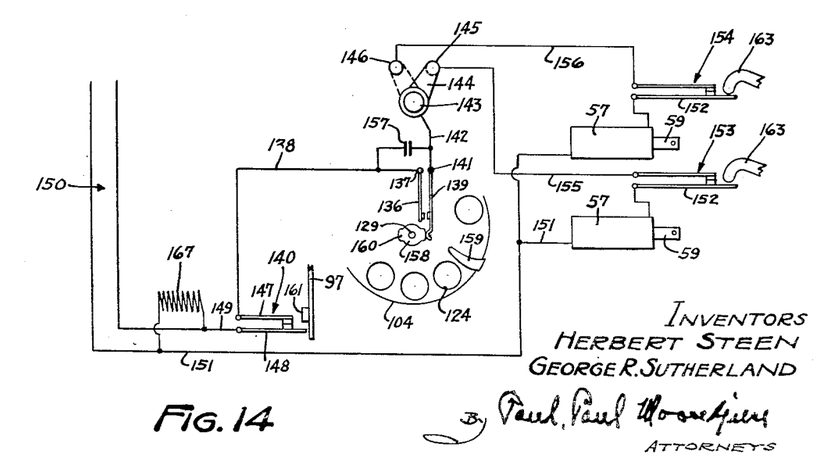
Figure 14 is a wiring diagram.

The wire 138 of the fixed contact 136 is shown connected to a contact 147 normally engaged by a contact 148 connected to a wire 149 of a supply circuit, generally indicated by the numeral 150. The other wire 151 of the supply circuit is connected to the corresponding ends of the windings of the two solenoids 57, as shown in Figure 14. The other ends of the solenoid windings are connected to the movable contacts of a pair of cutout switches, generally indicated by the numerals 153 and 154. Wires 155 and 156 connect the other sides of the switches 153 and 154, respectively, to the contacts 145 and 146 of the selector switch 143. A suitable condenser, generally indicated by the numeral 157, may be connected across the contacts 136 and 139 to prevent arcing between these contacts, when the apparatus is in operation.

The means for successively closing the supply circuits to the solenoids 57 comprises a disk 158 secured to the shaft 129 and having diametrically opposed high points 160 adapted to engage the projecting end of the movable contact 139. The parts of the control mechanism above described, are so arranged that each time the control dial or member 104 comes to rest, one of the high points of the disk 158 will be in engagement with the contact 139, whereby the supply of current to the solenoids is cut off.

The spacing between the finger receiving openings 124 of the dial is such that the spacing between adjacent holes represents one-half revolution of the disk 158, whereby one impulse is obtained each time the dial is rotated a distance representing the spacing between two adjacent holes. If the dial is rotated two or more holes, two or more impulses will be received, depending upon the number of holes the dial is rotated. The specific construction of the control mechanism shown in Figure 13, is more or less well known, and it is therefore thought unnecessary to herein further describe the same in detail. A finger stop 159 is secured to the support 123, adapted to be engaged by the operator's finger, to limit rotation of the dial by the operator's finger, as will readily be understood by reference to Figure 3.

When the cutout switches 140, 153 and 154 are closed, as shown in the wiring diagram (Figure 14), the machine is in condition for operation, whereby each time the dial 104 is rotated, one of the dispensing units will be operated to dispense one or more stamps, depending upon the number of holes that the dial is rotated. The main cutout switch 140 is preferably located on the wall 102 of the base, as shown in Figure 4. In this figure, it will be noted that the lower contact 148 of the switch 140, projects beyond the upper contact 147 into the path of an abutment 161 carried by the lower end of the locking bar 97. Thus, when the locking bar is moved downwardly to lock the casing to the operating mechanism, and the drawer against withdrawal, the abutment 161 will engage the contact 148 and open the switch 140, whereby the supply of current to the impulse device or circuit closer of the control unit 120 is cut off, so that the machine is rendered inoperative.

*Means for rendering dispensing unit inoperative, when stamps are exhausted*

Means is provided for rendering each dispensing unit inoperative, when the stamps therein have been exhausted. Such means is best shown in Figures 6 and 8, and comprises a lever 162 mounted for pivotal movement on the rod or shaft 6 and having an upturned lower terminal 166 adapted to pass through the opening 28 in the stamp guide 21, and into the groove 16 of the feed roll, when the last stamp has been fed from the machine. The terminal 166 of the arm 162 normally rides on the stamp strip, as the latter passes around the feed roll, whereby the lower terminal 166 thereof cannot enter the groove in the feed roll. The opposite or upper end of the arm 162 has a terminal 163 of a suitable insulating material secured thereto, adapted to engage the lower contact 152 of its respective cutout switch 153. When the arm 162 is in the position shown in Figure 8, it will be noted that the upper terminal 163 thereof has moved the contact 152 out of electrical engagement with its complemental contact 153, whereby the supply of current to its respective solenoid 57 is cut off, thereby rendering the empty unit inoperative until it has again been reloaded with a fresh supply of stamps. A small rib 164 is shown provided on the stamp guide 21, adapted to engage the arm 162 and move the terminal 166 thereof out of the groove in the feed roll, when the stamp guide is pressed rearwardly, as shown in Figure 6, to permit the stamp strip to be threaded around the feed roll. A suitable spring 165 is engaged with the arm 162 and constantly urges the lower end 166 thereof upwardly so that the upper face thereof will engage the stamp strip, when the machine is in normal operation, as shown in dotted lines in Figure 1. When thus positioned, the rib 164 is spaced from the arm 162 sufficiently to allow the lower terminal thereof to enter the groove 16 in the feed roll, when the last stamp has been fed from the machine. When the lower terminal 166 is thus received in the groove of the feed roll, the upper terminal 163 of the arm will engage and depress the contact 152, and thereby interrupt the supply of current to the solenoid 57 of that particular unit.

*Heating means*

Means is provided within the casing 91 for generating sufficient heat to maintain the interior of the apparatus in a dry state at all times, to prevent the adhesive or gum on the stamp strip from becoming tacky, whereby it might adhere to the parts of the dispensing mechanism and render the machine inoperative. Such a means is diagrammatically indicated in Figure 14, and may consist of a small resistance coil 167 connected across the wires 149 and 151 of the supply circuit. The heating coil 167 is also indicated in Figure 1, and may be located between the front wall 92 of the casing and the back wall 168 of the drawer 105.

Operation

Figure 3:
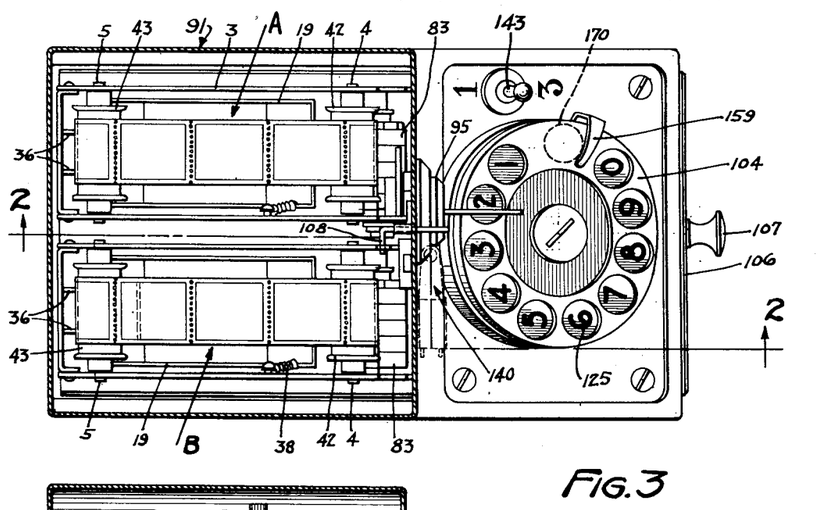
Figure 3 is a sectional plan view on the line 3—3 of Figure 2, showing the dial for controlling the number of stamps to be dispensed.
Figure 4:
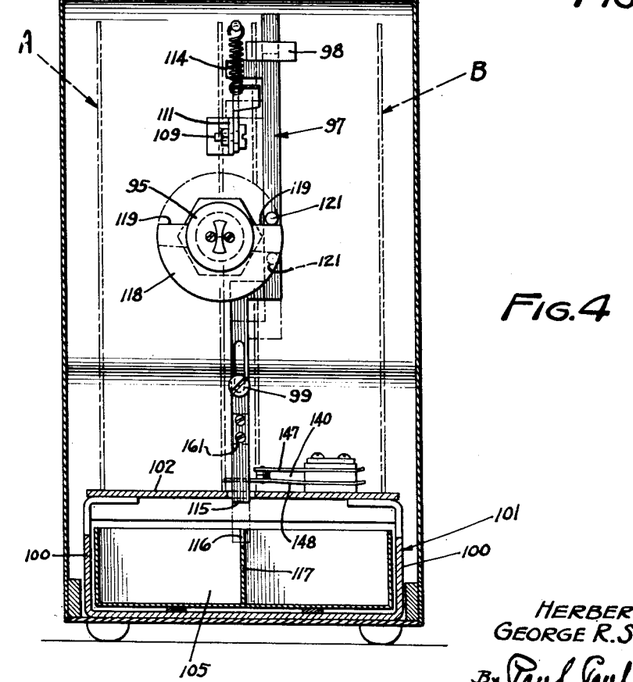
Figure 4 is a vertical sectional view on the line 4—4 of Figure 2, showing the means for locking the machine against operation.

The machine, as shown in Figure 3, is adapted for dispensing stamps of two different denominations as, for example 1 and 3 cent stamps. If a 1 cent stamp is desired, the switch 143 is moved towards the numeral 1, shown in Figure 3, thereby closing the circuit to the solenoid of the 1 cent stamp dispensing unit. If the switch lever is moved in a direction toward the numeral 3, as shown in Figure 3, the 3 cent stamp unit is electrically connected to the control member or dial 104, so that 3 cent stamps will be dispensed from the machine, when the dial is operated. The numerals shown through the finger receiving openings in the dial indicate the number of stamps dispensed each time the finger receiving opening over any given numeral on the disk is moved to the dotted line position, shown at 170 in Figure 3. In other words, if six 3 cent stamps are desired, the operator will place his finger in the opening over the numeral 6, and rotate the dial to the dotted line position 170. When the dial is released, the spring 131 will return the dial to its normal position shown in Figure 3, the speed of the dial being relatively slow and constant, as a result of the governor 135. During the return movement of the dial, the shaft 129 is rotated, whereby the contact 139 is moved in and out of engagement with the fixed contact 136, thereby successively energizing the solenoid of the 3 cent stamp unit six times, whereby six stamps will be automatically dispensed from the machine in rapid succession.

If desired, the selector switch 143 may be dispensed with and a separate dial provided for each dispensing unit. Such an arrangement may be desirable in large institutions such, for example, as post offices, where large quantities of stamps are sold, as the danger of error may be minimized with such an arrangement, because of the elimination of the selector switch 143.

Figure 15:
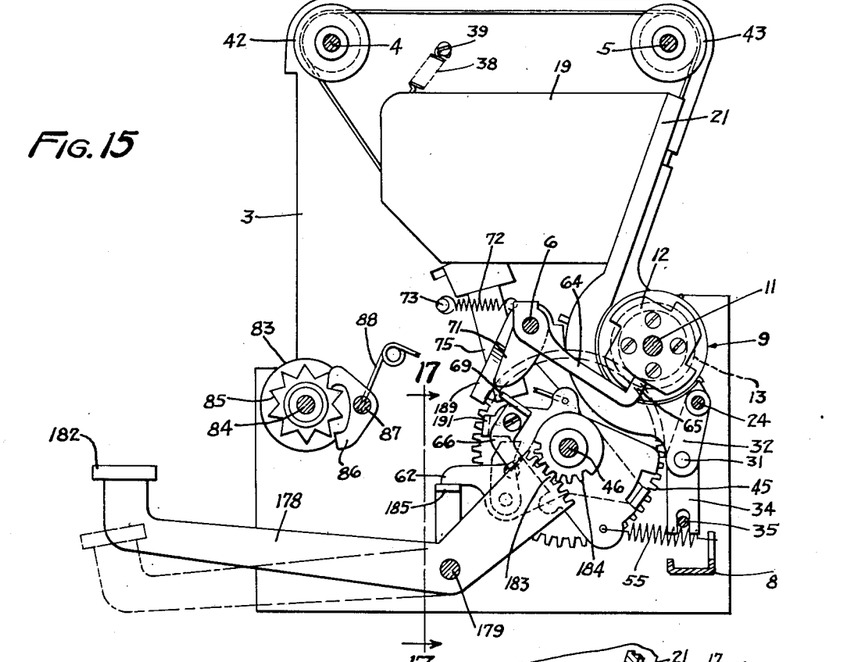
Figure 15 is a view showing a modified construction adapted for manual or lever operation.
Figure 17:
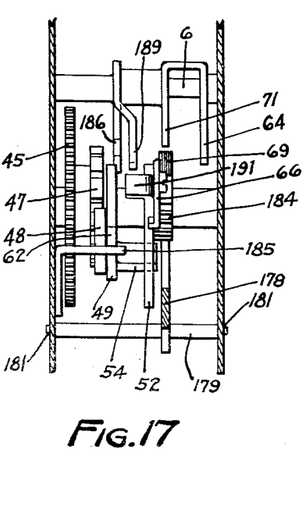
Figure 17 is a detail sectional view substantially on the line 17—17 of Figure 15, with some of the parts omitted.

In Figures 15, 16 and 17 there is shown a stamp dispensing unit adapted for manual operation. In the form here shown, the ratchet 47 is operated by a dog 48, similar to the dog shown in the previous figures, mounted on the plate 49. An operating lever 178 is secured to a shaft 179, having its terminals suitably supported in the side plates of the unit, as shown at 181 in Figure 17. The outer end of the lever 178 is provided with a suitable finger engaging button 182. The opposite end of the lever 178 has a rack or gear segment 183 adapted to mesh with a pinion 184 secured to the hub of the plate 52 whereby when the operating lever 182 is depressed, the plate 52 will be rotated to impart rotation to the plate 49, by reason of the lug 54 of the plate 49 engaging the lower end wall of the notch 53 of the member 52. The extension 62 of the plate 49 is adapted to engage a fixed bracket 185, whereby rotation of the plate 49 in a counterclockwise direction, when viewed as shown in Figures 15 and 16, is limited. Rotation of the rachet 47 in the opposite direction is limited by the bracket 75 secured to the side wall of the unit, as shown in Figure 15.

The manually operated unit, shown in Figures 15, 16 and 17, is also provided with means for locking the machine against operation, when all of the stamps have been dispensed. The means for thus locking the machine is shown comprising an arm 186, pivoted on the shaft 6 and having an offset end portion 187 adapted to be received in the groove 16 of the feed roll, when the last stamp has been fed from the feed roll. A spring 72 normally urges the end 187 of the arm 186 in a direction towards the feed roll, whereby said end will normally ride or engage the stamp strip in a manner similar to the terminal 166 of the arm 162, shown in Figures 1, 6 and 8. The arm 186 has a downwardly extending portion 189 positioned to be engaged by an offset lug 191 provided on the member 52, when the last stamp has been dispensed from the machine. When the machine is loaded with stamps and the end portion 187 of the arm 186 is in engagement with the stamp strip, the depending portion 189 of the arm 186 will be positioned out of the path of the lug 191, as shown in Figure 15, whereby the lever 178 may readily be depressed to operate the dispensing mechanism and thereby eject a stamp from the machine.

When the machine has been emptied of stamps, the arm 186 will be positioned as shown in Figure 16, whereby the lower end of the arm 189 will be positioned in the path of the lug 191 of the member 52, thereby positively locking the machine against operation. Before another stamp strip can be threaded around the feed roll, the lug 187 of the arm 186 must be moved out of the path of the stamp strip. This is accomplished by means of the flange 164 provided on the stamp guide 21, which engages a shoulder 192 provided on the arm 186. When the stamp guide is pressed inwardly as shown in Figure 6, the flange 164 will engage the shoulder 192 and thereby partially rotate the arm 186 to move the lug 187 out of the groove in the feed roll. The stamp strip may then be readily threaded around the feed roll, as hereinbefore stated, to reload the machine.

The unit shown in Figures 15 to 17, is extremely simple and inexpensive in construction and is adapted to be supported within a suitable casing, either in conjunction with other similar units, or as a single unit. Because of the dispensing unit being complete in itself, stamps of different denominations may readily be dispensed on a single machine by simply arranging the units in a bank in close proximity to one another, and loading each unit with stamps of a given denomination. In such a machine, the units are independently operable by manipulation of their respective operating levers 178, as shown in full and dotted lines in Figure 15, and an accurate account of each stamp dispensed will be recorded on the counter 83, which is actuated each time the operating lever 178 is depressed.

We claim as our invention:

1. A stamp dispensing machine comprising a holder for a roll of stamps in strip form, a feed roll, a mechanism for intermittently operating the feed roll, manually operable means for controlling the operation of said mechanism, a stamp guide for holding the stamp strip in feeding engagement with the feed roll, means whereby the stamp guide may be moved to a position to facilitate threading the stamp strip around the feed roll, when reloading the machine, and a member associated with the stamp guide and adapted to facilitate severing or detaching the dispensed stamp from the stamp strip.

2. A stamp dispensing machine comprising a holder for a roll of stamps in strip form, a feed roll, a mechanism for intermittently operating the feed roll, means for controlling the operation of said mechanism, a stamp guide having a portion partially surrounding the feed roll and adapted to normally hold the stamp strip in feeding engagement with the feed roll, stripper means for guiding the ejected stamp or end of the strip from the feed roll, and means operatively associated with the stamp guide for holding the stamp strip in proximity to the feed roll adjacent to the stripper means, thereby to facilitate severing the ejected stamp from the stamp strip.

3. A stamp dispensing machine comprising a holder for a roll of stamps in strip form having transverse rows of perforations therein, a feed roll having rows of teeth on its periphery adapted to engage the perforations in the stamp strip to feed the strip, a mechanism for intermittently operating the feed roll, means for controlling the operation of said mechanism, stripper means, a guide for holding the stamp strip in feeding engagement with the feed roll, means whereby the stamp guide may be moved relatively to the periphery of the feed roll to permit the stamp strip to be threaded around the feed roll, when reloading the machine, and a member located adjacent to the stripper means and having a severing edge adapted to hold the stamp strip in engagement with a row of teeth of the feed roll adjacent to the stripper means, thereby to facilitate severing the dispensed stamp from the stamp strip.

4. A stamp dispensing machine comprising means for holding a roll of stamps in strip form, a feed roll, a drive mechanism for the feed roll, a solenoid for operating said drive mechanism, a control member for the solenoid comprising a circuit electrically connecting it thereto and to a source of electric energy, a cutout switch in said circuit, a guide for guiding the stamp strip around the feed roll and holding it in feeding engagement therewith, said guide having an opening therein, an arm mounted for pivotal movement and having one end adapted to engage and open said cutout switch, when the arm is moved in one direction, the opposite end of said arm being received in the opening in said guide and normally engaging the stamp strip, whereby the stamp strip will prevent the arm from opening the switch, said arm being adapted to automatically open the switch, when the stamp strip is exhausted, whereby further operation of the machine is interrupted, until the machine has again been replenished with a fresh supply of stamps.

5. A stamp dispensing machine comprising means for holding a roll of stamps in strip form, a feed roll provided with a circumferential groove, a driving mechanism for the feed roll, a solenoid for operating said drive mechanism, a control member for the solenoid comprising a circuit electrically connecting it thereto and to a source of electric energy, a cutout switch in said circuit including a movable contact, a guide for guiding the stamp strip around the feed roll and holding it in feeding engagement therewith, said guide having an opening therein, a spring-actuated arm mounted for pivotal movement and having one end adapted to engage said movable contact to open the switch, when the arm is moved in one direction, the opposite end of said arm being received in the opening in said guide and normally riding on the stamp strip, whereby the stamp strip will prevent the opposite end of the arm from opening the switch, and the end of said arm which normally engages the stamp strip being adapted to enter the groove in the feed roll, when the stamp strip is exhausted, whereby the opposite end of the arm will engage and open the cutout switch, thereby to automatically interrupt operation of the machine until again reloaded with stamps.

6. In a machine of the class described, a feed roll, a driving mechanism therefor comprising a solenoid, a control member, a circuit connecting the control member to the solenoid and to a source of electric energy, a cutout switch in said circuit, a circuit closer made operable by movement of the control member to successively close the circuit to the solenoid, whereby it is operated to intermittently actuate the feed roll, and means controlled by the stamps fed around the feed roll to automatically open the cutout switch, when the last stamp has been fed from the machine, whereby the machine is rendered inoperative until again reloaded with stamps.

7. In a machine of the class described, a plurality of stamp dispensing units each comprising a feed roll, a driving mechanism for the feed roll of each unit including a solenoid, a single control member for said units, circuits connecting the control member to said solenoids and to a source of electric energy, a selector switch, a cutout switch for each solenoid, a circuit closer made operable by movement of the control member to successively close the circuit of a selected solenoid, whereby said selected solenoid may be operated to intermittently actuate its respective feed roll, and means controlled by the stamp strips fed around said feed rolls to automatically open the cutout switch of a given unit, when emptied of stamps, whereby said unit is rendered inoperative until again reloaded with stamps.

8. In a machine of the class described, a plurality of stamp dispensing units each comprising a feed roll having a circumferential groove, a driving mechanism for the feed roll of each unit including a solenoid, a single control member for said units, circuits connecting the control member to said solenoids and to a source of electric energy, a selector switch, a cutout switch for each solenoid, a circuit closer made operable by movement of the control member to successively close the circuit of a selected solenoid, whereby said selected solenoid may be operated to intermittently actuate its respective feed roll, a pivoted arm associated with the feed roll of each dispensing unit and each having one end adapted to be received in the groove of its respective feed roll, but normally restrained from entering said grooves by the stamp strips, the opposite ends of said pivoted arms being positioned to engage and open the cutout switches of their respective dispensing units, when the stamp strips thereof are exhausted, and the opposite ends of the arms are permitted to enter the grooves in the feed rolls, thereby to automatically open the cutout switch of a given unit, when the last stamp has been fed therefrom, whereby an empty unit is rendered inoperative until again reloaded with stamps.

9. In a stamp dispensing machine, a holder for a roll of stamps in strip form, a feed roll, a ratchet mechanism for intermittently operating the feed roll including an operating lever, an annular groove in the periphery of the feed roll, a pivoted element having one end alined with said groove and normally restrained from entering the groove by a portion of the stamp strip, said pivoted element having a lateral extension adapted to be moved into locking engagement with the ratchet mechanism to prevent operation of the operating lever, when all of the stamps have been fed from the machine and the pivoted element enters the groove in the feed roll.

10. In a stamp dispensing machine, a feed roll, a mechanism for driving the feed roll, means for locking the feed roll against movement at the end of each cycle of operation, said feed roll having a circumferential groove therein, a guide for holding the stamp strip in feeding engagement with the feed roll, said guide having an opening therein, an element mounted for pivotal movement and having an offset end portion received in said opening and alined with the groove in the feed roll and normally restrained from entering the groove in the feed roll by the stamp strip, an operating lever for actuating the drive mechanism, and means on said pivoted element adapted to be moved to a position to be engaged by the drive mechanism, when the stamp strip is exhausted and said offset end portion of the element enters the groove in the feed roll, whereby the operating lever is locked against further operation until the machine is again reloaded with a fresh stamp strip.

11. A stamp dispensing machine comprising a holder for a roll of stamps in strip form, a feed roll, a mechanism for intermittently operating the feed roll, means for controlling the operation of said mechanism, a stamp guide having a substantially straight upright portion and a lower portion partially encircling the feed roll and being pivotally mounted adjacent its lower end, and yieldable means urging movement of the stamp guide about the pivot to hold the stamp strip in feeding engagement with the feed roll, whereby the stamp guide may be moved about the pivot by manual movement of the upper portion against the tension of said yieldable means to facilitate threading the stamp strip around the feed roll.

12. A stamp dispensing machine as defined in claim 11 wherein the holder for the roll of stamps is supported on one side of the upper portion of the stamp guide opposite the side on which the stamp strip travels.

13. A stamp dispensing machine comprising a holder for a roll of stamps in strip form, a feed roll, a mechanism for intermittently operating the feed roll, means for controlling the operation of said mechanism, a stamp guide having a portion partially surrounding the feed roll and adapted normally to hold the stamp strip in feeding engagement with the feed roll, a member adapted to facilitate severing or detaching the dispensed stamp from the stamp strip, means whereby the stamp guide may be moved to a position to facilitate threading the stamp strip around the feed roll, when reloading the machine, and means operatively connecting the stamp guide to said member whereby said member is moved away from the feed roll by said movement of the stamp guide.

14. A stamp dispensing machine comprising means for supporting a stamp strip, a feed roll having spaced teeth at one end, a drive mechanism for operating the feed roll including a solenoid, a pawl actuated by the solenoid and a ratchet operatively connected to the feed roll and actuated by the pawl, a control member for the solenoid whereby it may be successively energized to intermittently actuate the feed roll through said pawl and ratchet, a pivoted locking member having one end adapted to engage a tooth of the feed roll at the end of each cycle of operation thereby to prevent overrunning of the feed roll, the locking member being connected to the solenoid and being moved out of engagement with the feed roll upon energization of the solenoid, and a lost motion connection between the solenoid and the pawl whereby the initial movement of the solenoid will move the locking means out of engagement with the feed roll without actuating the pawl.

15. A stamp dispensing machine comprising means for supporting a stamp strip, a feed roll having spaced teeth at one end, a drive mechanism for operating the feed roll including an operating lever, a pawl actuated by the lever and a ratchet operatively connected to the feed roll and actuated by the pawl, a pivoted locking member having one end adapted to engage a tooth of the feed roll at the end of each cycle of operation thereby to prevent over-running of the feed roll, the locking member being connected to the lever and being moved out of engagement with the feed roll by operation of the lever, and a lost motion connection between the lever and the pawl whereby the initial movement of the lever will move the locking means out of engagement with the feed roll without actuating the pawl.

HERBERT STEEN.
GEORGE R. SUTHERLAND.